Nov. 19, 1957     A. F. LEE     2,813,531
CANNULA
Filed Sept. 26, 1955
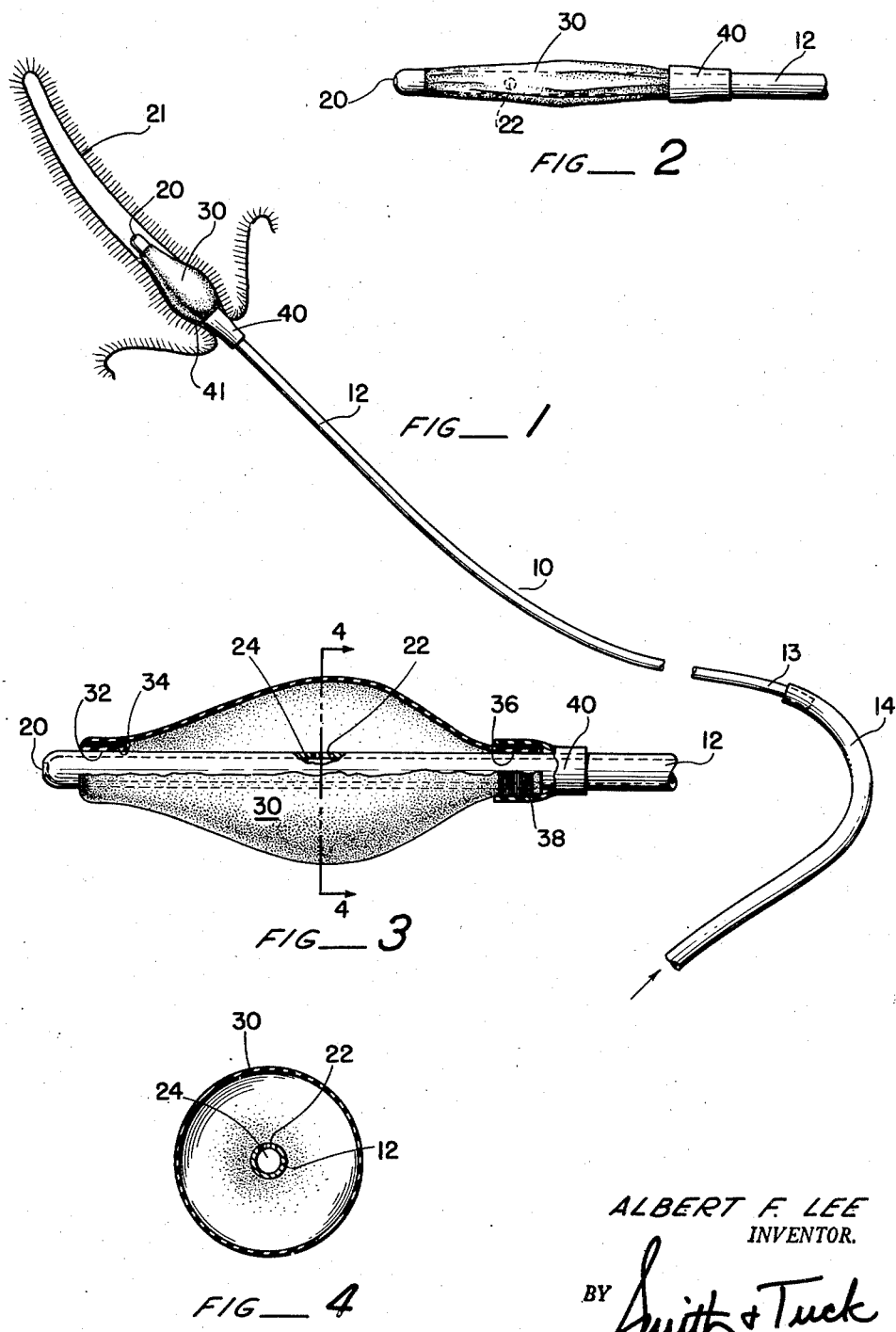
ALBERT F. LEE
INVENTOR.
BY Smith & Tuck

United States Patent Office 2,813,531
Patented Nov. 19, 1957

2,813,531

CANNULA

Albert F. Lee, Seattle, Wash.

Application September 26, 1955, Serial No. 536,331

1 Claim. (Cl. 128—350)

My invention relates to a cannula or the like designed to establish fluid connection with a body cavity. My cannula provides an inflatable retaining and sealing element in a single passage instrument.

My invention is shown in the accompanying drawings as a uterine cannula, and this embodiment will demonstrate the type of problems which are solved by my device, although my device will have other applications as set forth hereinafter.

In prior uterine cannulas, an acorn is usually provided to form a fluid seal in the cervical canal and a tenaculum is used to grasp the cervix to hold the acorn in place. This device is painful and hazardous. The patent to Kahn No. 2,482,622, shows structure which is typical of this approach.

Some prior attempts have been made to provide an instrument such as a catheter with an inflatable section; but these devices have provided a first passageway for establishing fluid connection with the body cavity and have provided a second passageway to feed the inflatable element. The catheter of Raiche, Patent No. 2,687,131, is typical of these prior devices.

The objectives of my invention include: to provide a uterine cannula or similar device which avoids the use of an acorn and tenaculum or similar sealing and holding devices, in which a single-passageway tube has an inflatable sealing and holding element; to devise means for painlessly and harmlessly sealing a passageway to a body cavity without the use of a plugging element and a gripping jaw; to provide means for establishing fluid communication with various body cavities wherein adequate securing to and sealing of a passageway by wedging and grasping means is impossible or undesirable; and to provide the above in an instrument of economical construction, simple operation, minimum size, and adapted to be easily sterilized.

My invention will be best understood, together with additional objectives and advantages thereof, from a reading of the following description, with reference to the drawings, in which:

Figure 1 is a schematic, fragmentary view showing a specific embodiment of my instrument in place in a cervical canal;

Figure 2 is an enlarged side view of the distal portion of the cannula;

Figure 3 is a view in the same sense as Figure 2 only enlarged and shown partially in section; and Figure 4 is a sectional view taken on lines 4—4 of Figure 3.

The uterine cannula shown in the drawings has a tube 12 of minimum diameter, i. e., an eighth-inch outside diameter is normally suitable. In order to maintain a minimum tube size, it is desirable to have a single passageway in the tube. The single-passageway instrument is also more economical to construct and easier to clean and sterilize. The tube may be bendable, but should normally be rigid. At its proximal end 13 it is connected to a fluid supply tube 14 which may be secured thereto by a slip fit if the supply tube is of plastic or other resilient construction.

The distal end has a restricted discharge or outlet orifice 20 for supplying fluid or gas to the uterus 21. Spaced inward of the orifice 20 a short distance, i. e., about one-half inch, is a port 22 in communication with the single liquid passageway 24 in tube 12. An inflatable balloon-like member is formed by sac 30 which may be approximately an inch in length.

Figure 3 shows suitable securing means for sac 30 in which a first end 32 is invaginated and secured between inner and outer wraps or layers by threads 34. The second end 36 is likewise anchored by a winding or wrap of thread 38. Preferably a resilient sleeve member 40 is slipped over this latter binding. Sac 30 is formed of resilient thin rubber material of the type used to form balloons and the like. As shown in Figure 2, sac 30 may have some folds in its unexpanded position so that part of its expansion to the position of Figure 3 may be an unfolding and part a stretching.

Sleeve 40 is not an acorn in the sense that it has a broad wedging function in the operation. It has little, if any, expanding effect on the entrance 41 of the cervical canal and hence the insertion of the instrument is comparatively painless considering the prior art devices. The sealing means is the sac 30, which not only seals the cervical passageway, but also holds the instrument in place by its action against the relatively firm and fibrous entrant lips 41 of the cervix.

It is surprising that sac 30 is able to achieve this securing and sealing function. To one unacquainted with my experience with this device, it would appear that the sac 30 would not inflate unless there was a positive seal behind it in the nature of a wedging acorn as previously used. Further, it would not appear that the sac would inflate at all even if it had a fluid-tight seal behind it because orifice 20 permits fluid escape and fluid communication to the exterior of the sac. Experience has shown, however, that as fluid or gas is slowly supplied to the uterus the balloon expands in the manner shown in Figure 1 and prevents escape of the fluid and holds the device in place. This is an unobvious phenomenon. It is believed that a strong back pressure is developed with the cavity which causes a diversion of fluid or gas into sac 30, causing it to expand.

Before removal from canal 41, pressure is released. The extension of the sac is not painful or harmful. In fact, I have largely obviated the pain and reduced possibility of injury associated with prior uterine cannulas. Further, I have provided these results and advantages in a simply constructed single-passageway instrument, instead of in a double passageway as was deemed necessary in prior instruments having inflatable ends.

As a uterine cannula, the instrument has use in passing air, gas and radio-opaque media into the cervix, uterus and fallopian tubes for diagnostic and therapeutic effects. It has other use in inter-uterine, tubal and pelvic peritoneal fluid and gas medication. There are other uses for this self-inflating cannula, to be found in filling other body cavities with air, gas, medicated fluids and powders and radio-opaque media. The balloon seal is an aid in these operations because of its simplicity, ease of use, and non-traumatic characteristics which reduce bleeding, bruising and pain. Further, this instrument has commercial possibilities in filling rubber, plastic and other expandible or semi-expandible containers with air, gas or liquids.

While I have shown and described particular embodiments of my inveniton, it will occur to those skilled in the art that various changes and modifications may be made without departing from the invention, and I, therefore, aim in the appended claim to cover all such changes and modifications as fall within the true spirit and scope of my invention.

Having thus described my invention, I claim:

A device for administering a fluid to a cavity and adapted to engage the mouth of the cavity to effect a seal and to retain the device in place, comprising: a stiff, single-passageway tube having a restricted orifice at one end and adapted to be connected to a source of fluid under pressure at the other end, a balloon type sleeve encircling a portion of said tube adjacent said orifice and secured thereto by having a first end invaginated and bound between the folds of the invagination and by having the second end bound on its outer surface and covered by a protective sleeve, said tube having a port in its wall within the portion surrounded by said sleeve, said port serving to pass fluid into and out of said sac.

References Cited in the file of this patent
UNITED STATES PATENTS 397,060    Knapp ----------------- Jan. 29, 1889